United States Patent
Koizumi

(10) Patent No.: US 8,706,355 B2
(45) Date of Patent: Apr. 22, 2014

(54) STEERING CONTROL SYSTEM

(75) Inventor: Ruriko Koizumi, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 85 days.

(21) Appl. No.: 13/376,432

(22) PCT Filed: Jul. 29, 2009

(86) PCT No.: PCT/JP2009/063502
§ 371 (c)(1),
(2), (4) Date: Dec. 6, 2011

(87) PCT Pub. No.: WO2011/013217
PCT Pub. Date: Feb. 3, 2011

(65) Prior Publication Data
US 2012/0089301 A1 Apr. 12, 2012

(51) Int. Cl.
*A01B 69/00* (2006.01)
(52) U.S. Cl.
USPC ............................. 701/42; 180/400
(58) Field of Classification Search
USPC .................. 701/41, 42; 180/6.24, 9.38, 400
See application file for complete search history.

(56) References Cited

U.S. PATENT DOCUMENTS

| | | | | |
|---|---|---|---|---|
| 5,347,458 A | * | 9/1994 | Serizawa et al. | 701/41 |
| 6,302,441 B1 | * | 10/2001 | Kawamuro et al. | 280/771 |
| 6,801,840 B2 | * | 10/2004 | Kodama et al. | 701/21 |
| 6,915,194 B2 | * | 7/2005 | Kodama et al. | 701/41 |
| 6,922,621 B2 | * | 7/2005 | Kodama et al. | 701/41 |
| 7,562,738 B2 | * | 7/2009 | Suyama et al. | 180/332 |

(Continued)

FOREIGN PATENT DOCUMENTS

| | | |
|---|---|---|
| JP | 10 329728 | 12/1998 |
| JP | 11 310146 | 11/1999 |

(Continued)

OTHER PUBLICATIONS

English translation of the International Preliminary Report on Patentability and Written Opinion of the International Searching Authority issued Feb. 16, 2012, in PCT/JP2009/063502, filed Jul. 29, 2009.

(Continued)

*Primary Examiner* — Helal A Algahaim
*Assistant Examiner* — Shardul Patel
(74) *Attorney, Agent, or Firm* — Oblon, Spivak, McClelland, Maier & Neustadt, L.L.P.

(57) ABSTRACT

A tire angle change motor steers a host vehicle according to a tire angle corresponding to the rotation angle of a steering wheel detected by a steering wheel angle sensor. A gear ratio calculating unit of a tire angle control unit changes the amount of steering corresponding to the rotation angle of the steering wheel required for the tire angle change motor to steer the host vehicle, depending on the amount of pushing of the steering wheel detected by the pushing amount sensor. Therefore, it is possible to improve the convenience of a driving operation for steering. A pushing direction reaction force motor changes a reaction force generated against the amount of pushing of the steering wheel by the driver, depending on the speed of the host vehicle detected by a vehicle speed sensor. Therefore, the reaction force makes it possible to prevent the host vehicle from being steered by an unintended operation of the driver in various traveling states of the vehicle.

9 Claims, 11 Drawing Sheets

(56) References Cited

U.S. PATENT DOCUMENTS

| | | | |
|---|---|---|---|
| 2002/0063015 A1 | 5/2002 | Sugitani et al. | |
| 2003/0014169 A1 | 1/2003 | Kato et al. | |
| 2003/0055545 A1* | 3/2003 | Uenuma et al. | 701/41 |
| 2003/0094054 A1 | 5/2003 | Font | |
| 2004/0016591 A1 | 1/2004 | Kojo et al. | |
| 2004/0056748 A1 | 3/2004 | Masaki et al. | |
| 2005/0027402 A1 | 2/2005 | Koibuchi et al. | |
| 2005/0205345 A1 | 9/2005 | Hayashi | |
| 2006/0015231 A1* | 1/2006 | Yoshimura et al. | 701/48 |
| 2006/0019558 A1 | 1/2006 | Mizutani et al. | |
| 2007/0265752 A1 | 11/2007 | Hayama et al. | |
| 2008/0027609 A1 | 1/2008 | Aoki et al. | |
| 2008/0174415 A1* | 7/2008 | Tanida et al. | 340/438 |
| 2008/0243339 A1* | 10/2008 | Nishimori et al. | 701/41 |
| 2008/0249685 A1 | 10/2008 | Hara et al. | |
| 2009/0076676 A1 | 3/2009 | Yamamoto et al. | |
| 2010/0030421 A1* | 2/2010 | Yoshimura et al. | 701/29 |
| 2010/0318264 A1* | 12/2010 | Maeda et al. | 701/42 |
| 2011/0320090 A1 | 12/2011 | Barthomeuf et al. | |
| 2012/0089301 A1 | 4/2012 | Koizumi | |
| 2012/0277954 A1 | 11/2012 | Kimura et al. | |

FOREIGN PATENT DOCUMENTS

| | | | |
|---|---|---|---|
| JP | 11 334628 | | 12/1999 |
| JP | 2000-52997 | A | 2/2000 |
| JP | 2000 203444 | | 7/2000 |
| JP | 2002-160642 | A | 6/2002 |
| JP | 2003-205846 | | 7/2003 |
| JP | 2006 44460 | | 2/2006 |
| JP | 2007-245908 | | 9/2007 |
| JP | 2008 81042 | | 4/2008 |
| JP | 2008-174047 | A | 7/2008 |
| JP | 2008 230427 | | 10/2008 |
| JP | 2008-262455 | A | 10/2008 |
| JP | 2008230427 | A * | 10/2008 |
| WO | WO 2009/063502 | A2 | 5/2009 |

OTHER PUBLICATIONS

International Search Report Issued Oct. 20, 2009 in PCT/JP09/63502 Filed Jul. 29, 2009.
U.S. Appl. No. 13/375,605, filed Dec. 1, 2011, Kimura et al.
U.S. Appl. No. 13/376,432, filed Dec. 6, 2011, Koizumi.
U.S. Office Action dated Sep. 12, 2013, issued in related co-pending U.S. Appl. No. 13/375,605, filed Dec. 1, 2011.

* cited by examiner

STEERING CONTROL SYSTEM

TECHNICAL FIELD

The present invention relates to a steering control system and more particularly, to a steering control system that combines the operations of a driver in different directions to control the steering of a host vehicle.

BACKGROUND ART

In general, the driver rotates a steering wheel at a predetermined angle to steer the vehicle. In general, the amount of steering with respect to the rotation angle of the steering wheel is constant. However, in some cases, when the vehicle travels at a low speed, the driver wants to rotate the steering wheel at a small angle to turn the vehicle at a large angle. In addition, in some cases, when the vehicle travels at a high speed, the driver wants to reduce the amount of steering with respect to the rotation angle of the steering wheel to drive the vehicle stably. Therefore, when the amount of steering with respect to the rotation angle of the steering wheel is constant, the convenience of the actual driving operation is low.

For example, Patent Literature 1 discloses a steering device in which the steering wheel can be rotated and tilted in the left-right direction. In the steering device disclosed in Patent Literature 1, the amount of steering with respect to the rotation angle of the steering wheel is changed by the tilt angle of the steering wheel. In the steering device disclosed in Patent Literature 1, when there is a concern that the driver will unintentionally tilt the steering wheel due to the acceleration of the vehicle, the amount of steering with respect to the rotation angle of the steering wheel is maintained constant.

CITATION LIST

Patent Literature

[Patent Literature 1] Japanese Unexamined Patent Application Publication No. 2008-230427

SUMMARY OF INVENTION

Technical Problem

In the above-mentioned technique, it is possible to prevent the driver from unintentionally changing the amount of steering with respect to the rotation angle of the steering wheel due to the acceleration of the vehicle. However, in the above-mentioned technique, when the acceleration of the vehicle is large, it is difficult to change the amount of steering with respect to the rotation angle of the steering wheel using the tilt angle of the steering wheel. Therefore, a technique is preferable which is capable of preventing the vehicle from being steered by an unintended operation of the driver and improving the convenience of a driving operation for steering, in various traveling states of the vehicle.

The invention has been made in view of the above-mentioned problems and an object of the invention is to provide a steering control system capable of preventing a vehicle from being steered by an unintended operation of the driver and improving the convenience of a driving operation for steering, in various traveling states of the vehicle.

Solution to Problem

According to the invention, a steering control system includes: a steering unit that steers a host vehicle according to an amount of steering corresponding to a first operation amount of the host vehicle by a driver in a first direction; a steering amount change unit that changes the amount of steering corresponding to the first operation amount required for the steering unit to steer the host vehicle, depending on a second operation amount of the host vehicle by the driver in a second direction; a reaction force generating unit that generates a reaction force against the second operation amount in a direction opposite to the second direction; and a traveling state detecting unit that detects a traveling state of the host vehicle. The reaction force generating unit changes the generated reaction force, depending on the traveling state of the host vehicle detected by the traveling state detecting unit.

According to this structure, the steering unit steers the host vehicle at the amount of steering corresponding to the first operation amount of the host vehicle by the driver in the first direction. In addition, the steering amount change unit changes the amount of steering corresponding to the first operation amount required for the steering unit to steer the host vehicle, depending on the second operation amount of the host vehicle by the driver in the second direction. Therefore, the amount of steering corresponding to the first operation amount of the driver is changed by the second operation amount of the driver, which makes it possible to improve the convenience of a driving operation for steering. In addition, in this structure, the reaction force generating unit changes the reaction force generated against the second operation amount of the driver, depending on the traveling state of the host vehicle detected by the traveling state detecting unit. Therefore, it is possible to prevent the vehicle from being steered by an unintended operation of the driver using the reaction force, in various traveling states of the vehicle.

In this case, the second operation amount in the second direction may include a component in a front-rear direction of the host vehicle.

According to this structure, the reaction force generating unit changes the reaction force generated against the second operation amount of the driver in the second direction which includes the component in the front-rear direction of the host vehicle, depending on the traveling state of the host vehicle detected by the traveling state detecting unit. Therefore, for the operation including the component in the front-rear direction of the host vehicle which is likely to be affected by the acceleration of the host vehicle in the traveling direction, it is possible to prevent the vehicle from being steered by an unintended operation of the driver using the reaction force.

The second direction may be perpendicular to the first direction.

According to this structure, since the second direction is perpendicular to the first direction, it is easy for the driver to give each of the first operation amount and the second operation amount to the system.

One of the first operation amount in the first direction and the second operation amount in the second direction may be a rotation angle in a rotation direction about a predetermined rotating shaft, and the other one of the first operation amount in the first direction and the second operation amount in the second direction may be a tilt angle of the rotating shaft on a predetermined fulcrum.

According to this structure, one of the first operation amount in the first direction and the second operation amount in the second direction is a rotation angle in a rotation direction about a predetermined rotating shaft, and the other one of the first operation amount in the first direction and the second operation amount in the second direction is the tilt angle of the rotating shaft on a predetermined fulcrum. Therefore, it is possible to use one of the first operation amount and the second operation amount as the rotation angle of the steering wheel of the host vehicle in the rotation direction. In addition, it is possible to use the other one of the first operation amount and the second operation amount as the tilt angle of the rotating shaft of the steering wheel of the host vehicle on the fulcrum. Therefore, the driver can perform a general operation, such as an operation of rotating, for example, the steering wheel about the rotating shaft or an operation of tilting, for example, the rotating shaft of the steering wheel on a predetermined fulcrum, to control steering. As a result, it is possible to further improve the convenience of a driving operation for steering.

The first operation amount in the first direction may be a rotation angle of a steering wheel of the host vehicle in a rotation direction, and the second operation amount in the second direction may be the distance of the steering wheel pushed or pulled in a direction parallel to the rotating shaft.

According to this structure, the first operation amount in the first direction is the rotation angle of the steering wheel of the host vehicle in the rotation direction, and the steering unit performs steering on the basis of the amount of steering corresponding to the rotation angle of the steering wheel. In addition, the second operation amount in the second direction is the distance of the steering wheel pushed or pulled in a direction parallel to the rotating shaft. Therefore, the steering amount change unit can change the amount of steering corresponding to the rotation angle of the steering wheel so as to correspond to a general operation of the driver which pushes or pulls the steering wheel in the direction parallel to the rotating shaft. As a result, it is possible to further improve the convenience of a driving operation for steering. In addition, the reaction force generating unit changes the reaction force generated against the operation of the driver pushing the steering wheel in the direction parallel to the rotating shaft, depending on the traveling state of the host vehicle detected by the traveling state detecting unit. Therefore, for the operation of the driver moving the steering wheel in the direction parallel to the rotating shaft which is likely to be affected by the acceleration of the host vehicle in the traveling direction, it is possible to prevent the vehicle from being steered by an unintended operation of the driver using the reaction force.

The traveling state detecting unit may detect the speed of the host vehicle as the traveling state of the host vehicle.

According to this structure, the traveling state detecting unit detects the speed of the host vehicle as the traveling state of the host vehicle. Therefore, the reaction force generating unit changes the reaction force generated against the second operation amount of the driver, depending on the speed of the host vehicle detected by the traveling state detecting unit. Stability and responsiveness required for the steering operation of the driver vary depending on the speed of the host vehicle. However, in this structure, it is possible to adjust the stability and responsiveness of the steering operation of the driver using the reaction force, according to the speed of the host vehicle.

In this case, the reaction force generating unit may increase the generated reaction force as the speed of the host vehicle detected by the traveling state detecting unit increases.

According to this structure, the reaction force generating unit increases the generated reaction force as the speed of the host vehicle detected by the traveling state detecting unit increases. As the speed of the host vehicle increases, stability required for the steering operation of the driver increases. However, in this structure, as the speed of the host vehicle increases, a stronger reaction force is generated. Therefore, it is possible to improve the stability of the steering operation of the driver.

The traveling state detecting unit may detect the deceleration of the host vehicle as the traveling state of the host vehicle.

According to this structure, the traveling state detecting unit detects the deceleration of the host vehicle as the traveling state of the host vehicle. Therefore, the reaction force generating unit changes the reaction force generated against the second operation amount of the driver, depending on the deceleration of the host vehicle detected by the traveling state detecting unit. As a result, for the operation of the driver which is likely to be affected by the deceleration of the host vehicle, it is possible to prevent the vehicle from being steered by an unintended operation of the driver using the reaction force.

In this case, the reaction force generating unit may increase the generated reaction force as the deceleration of the host vehicle detected by the traveling state detecting unit increases.

According to this structure, the reaction force generating unit increases the generated reaction force as the deceleration of the host vehicle detected by the traveling state detecting unit increases. As the deceleration of the host vehicle increases, the operation of the driver is more likely to be affected. However, in this structure, as the deceleration of the host vehicle increases, a stronger reaction force is generated. Therefore, it is possible to prevent the vehicle from being steered by an unintended operation of the driver using the reaction force.

In this case, the steering control system according to the invention may further include a driver weight detecting unit that measures the weight of the driver of the host vehicle. The reaction force generating unit may increase the generated reaction force as the weight of the driver of the host vehicle detected by the driver weight detecting unit increases.

According to this structure, the reaction force generating unit increases the generated reaction force as the weight of the driver of the host vehicle detected by the driver weight detecting unit increases. As the weight of the driver increases, the operation of the driver is more likely to be affected at the same deceleration. However, in this structure, as the weight of the driver increases, a stronger reaction force is generated. Therefore, it is possible to prevent the vehicle from being steered by an unintended operation of the driver using the reaction force.

The reaction force generating unit may generate a spring reaction force, which is the product of a spring coefficient corresponding to the traveling state of the host vehicle detected by the traveling state detecting unit and the second operation amount, as the reaction force.

According to this structure, the reaction force generating unit generates the spring reaction force which is proportional to the second operation amount as the reaction force. Therefore, it is possible to improve the stability of the operation of the driver. The spring reaction force is determined by the spring coefficient corresponding to the traveling state of the host vehicle. Therefore, the reaction force generating unit can generate a reaction force suitable for the traveling state of the host vehicle.

The reaction force generating unit may generate a viscosity reaction force, which is the product of a viscosity coefficient corresponding to the traveling state of the host vehicle detected by the traveling state detecting unit and a variation in the second operation amount per unit time, as the reaction force.

According to this structure, the reaction force generating unit generates the viscosity reaction force which is proportional to a variation in the second operation amount per unit time as the reaction force. Therefore, it is possible to improve the stability of the operation of the driver. The viscosity reaction force is determined by the viscosity coefficient corresponding to the traveling state of the host vehicle. Therefore, the reaction force generating unit can generate a reaction force suitable for the traveling state of the host vehicle.

The traveling state detecting unit may detect the acceleration of the host vehicle in a horizontal direction as the traveling state of the host vehicle.

According to this structure, the traveling state detecting unit detects the acceleration of the host vehicle in the horizontal direction as the traveling state of the host vehicle. Therefore, the reaction force generating unit changes the reaction force generated against the second operation amount of the driver, depending on the acceleration of the host vehicle in the horizontal direction which is detected by the traveling state detecting unit. Therefore, for the operation of the driver which is likely to be affected by the acceleration of the host vehicle in the horizontal direction, it is possible to prevent the vehicle from being steered by an unintended operation of the driver using the reaction force.

In this case, the reaction force generating unit may generate a viscosity reaction force, which is the product of a viscosity coefficient corresponding to the acceleration of the host vehicle in the horizontal direction which is detected by the traveling state detecting unit and a variation in the second operation amount per unit time, as the reaction force. The reaction force generating unit may increase the generated viscosity reaction force as the acceleration of the host vehicle in the horizontal direction which is detected by the traveling state detecting unit increases.

According to this structure, the reaction force generating unit generates the viscosity reaction force, which is the product of the viscosity coefficient corresponding to the acceleration of the host vehicle in the horizontal direction which is detected by the traveling state detecting unit and the variation in the second operation amount per unit time, as the reaction force. The reaction force generating unit increases the generated viscosity reaction force as the acceleration of the host vehicle in the horizontal direction which is detected by the traveling state detecting unit increases. As the acceleration of the host vehicle in the horizontal direction increases, the driver is more likely to perform an unintended operation. However, in this structure, as the acceleration of the host vehicle in the horizontal direction increases, a stronger viscosity reaction force is generated. Therefore, it is possible to prevent the vehicle from being steered by an unintended operation of the driver using the viscosity reaction force.

The steering control system according to the invention may further include an operation member that is used by the driver of the host vehicle to give the second operation amount in the second direction and a holding state detecting unit that detects a holding state of the operation member by the driver of the host vehicle. The reaction force generating unit may change the generated reaction force, depending on the holding state detected by the holding state detecting unit.

According to this structure, the steering control system further includes the operation member that is used by the driver of the host vehicle to give the second operation amount in the second direction and the holding state detecting unit that detects the holding state of the operation member by the driver of the host vehicle. The reaction force generating unit changes the generated reaction force, depending on the holding state detected by the holding state detecting unit. The possibility of the driver performing an unintended operation varies depending on the holding state of the operation member by the driver. However, in this structure, it is possible to prevent the vehicle from being steered by an unintended operation of the driver using the reaction force corresponding to the holding state.

The holding state detecting unit may detect, as the holding state, whether the driver of the host vehicle holds the operation member with one hand or both hands. The reaction force generating unit may generate the spring reaction force, which is the product of the spring coefficient corresponding to the traveling state of the host vehicle detected by the traveling state detecting unit and the second operation amount, and the viscosity reaction force, which is the product of the viscosity coefficient corresponding to the traveling state of the host vehicle detected by the traveling state detecting unit and the variation in the second operation amount per unit time. When the holding state detecting unit detects that the driver of the host vehicle holds the operation member with one hand, the reaction force generating unit may reduce the spring reaction force and increase the viscosity reaction force, as compared to when the holding state detecting unit detects that the driver of the host vehicle holds the operation member with both hands.

In this structure, the holding state detecting unit detects, as the holding state, whether the driver of the host vehicle holds the operation member with one hand or both hands. The reaction force generating unit generates the spring reaction force, which is the product of the spring coefficient corresponding to the traveling state of the host vehicle detected by the traveling state detecting unit and the second operation amount, and the viscosity reaction force, which is the product of the viscosity coefficient corresponding to the traveling state of the host vehicle detected by the traveling state detecting unit and the variation in the second operation amount per unit time. When the holding state detecting unit detects that the driver of the host vehicle holds the operation member with one hand, the reaction force generating unit reduces the spring reaction force and increases the viscosity reaction force, as compared to when the holding state detecting unit detects that the driver of the host vehicle holds the operation member with both hands. When the driver holds the operation member with one hand, the possibility of the driver performing an unintended operation due to the spring reaction force is more than that when the driver holds the operation member with both hands. However, in this structure, when the driver holds the operation member with one hand, the spring reaction force is reduced and the viscosity reaction force increases, as compared to when the driver holds the operation member with both hands. Therefore, it is possible to prevent the movement of the operation member and thus prevent the vehicle from being steered by an unintended operation of the driver.

Advantageous Effects Of Invention

According to the invention, it is possible to provide a steering control system capable of preventing a vehicle from being steered by an unintended operation of the driver and improving the convenience of a driving operation for steering in various traveling states of the vehicle.

DESCRIPTION OF EMBODIMENTS

Figure 1:
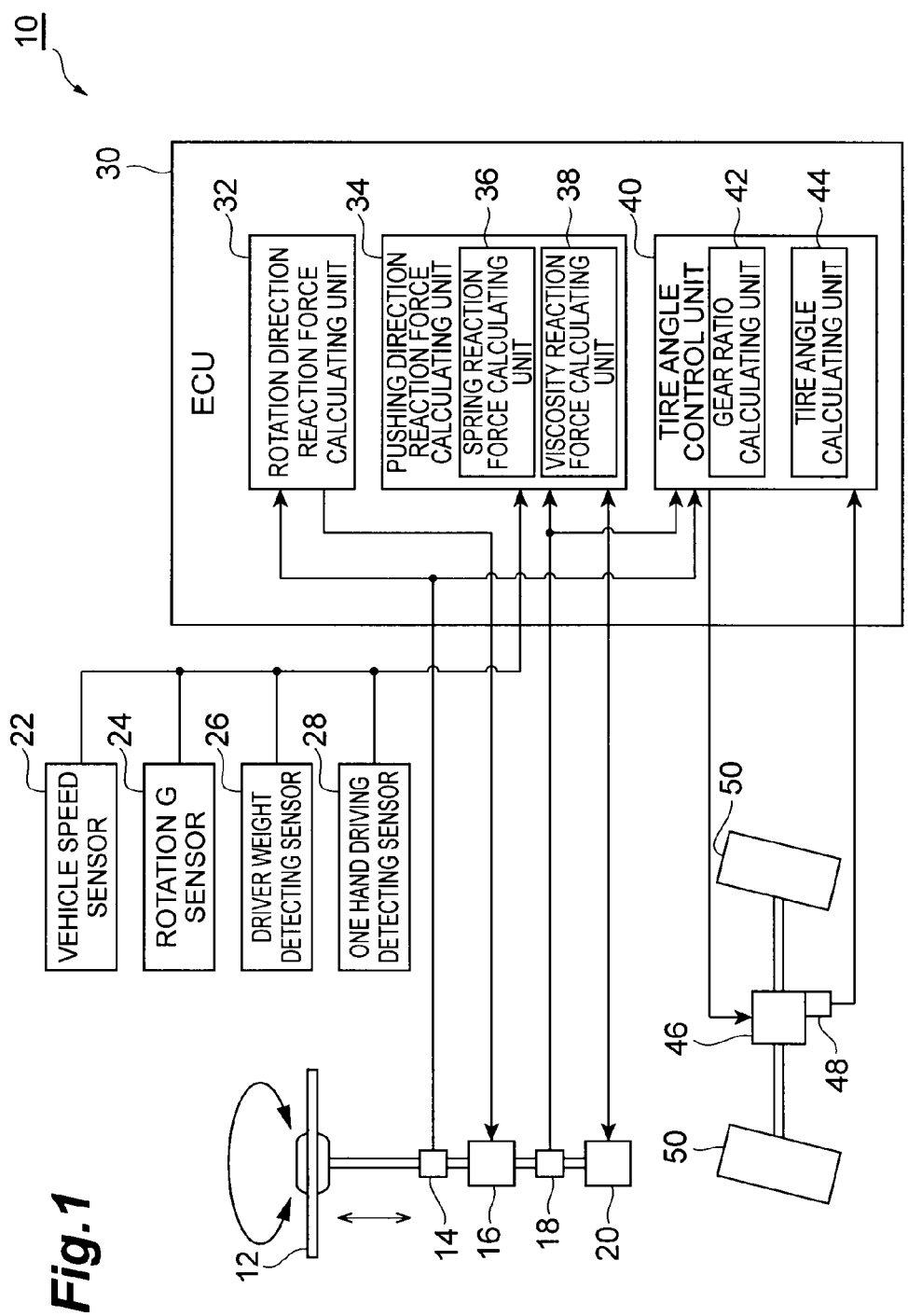
FIG. 1 is a block diagram illustrating the structure of a steering control system according to an embodiment.

Hereinafter, a vehicle control system according to an embodiment of the invention will be described with reference to the accompanying drawings. As shown in FIG. 1, a steering control system 10 according to this embodiment is a steer-by-wire type in which a steering wheel 12 is mechanically separated from front tires 50. As shown in FIG. 1, the steering wheel 12 can be rotated about a rotating shaft. In addition, the steering wheel 12 can be pushed and pulled in a direction parallel to the rotating shaft.

A steering wheel angle sensor 14 that detects the rotation angle of the steering wheel about the rotating shaft is attached to the rotating shaft of the steering wheel 12. A rotation direction reaction force motor 16 that generates reaction force against the operation of the driver rotating the steering wheel is attached to the rotating shaft of the steering wheel 12.

A pushing amount sensor 18 that detects the amount of pushing and the amount of pulling of the steering wheel in the direction parallel to the rotating shaft is attached to the rotating shaft of the steering wheel 12. A pushing direction reaction force motor 20 that generates reaction force against the operation of the driver pushing and pulling the steering wheel is attached to the rotating shaft of the steering wheel 12.

The steering control system 10 includes a vehicle speed sensor 22, a rotation G sensor 24, a driver weight detecting sensor 26, and a one hand detecting sensor 28. The vehicle speed sensor 22 detects the speed, acceleration, and deceleration of a host vehicle from the rotation speed of the axle of the host vehicle. The rotation G sensor 24 detects the acceleration of the host vehicle in the horizontal direction when the host vehicle turns or changes its lane.

The driver weight detecting sensor 26 is a pressure sensor which is provided on the bottom of a driver's seat. The driver weight detecting sensor detects the weight of the driver. The one hand driving detecting sensor 28 is a pressure sensor that is provided in a portion of the steering wheel 12 which is held by the driver. The one hand driving detecting sensor 28 detects the holding pressure of the driver to detect whether the driver holds the steering wheel with one hand or both hands.

The steering control system 10 includes an ECU (Electronic Control Unit) 30 that controls the operation of the steering control system 10. The ECU 30 includes a rotation direction reaction force calculating unit 32, a pushing direction reaction force calculating unit 34, and a tire angle control unit 40. The rotation direction reaction force calculating unit 32 calculates a reaction force value around the rotating shaft of the steering wheel 12 which is proportional to the rotation angle of the steering wheel 12 detected by the steering wheel angle sensor 14. The rotation direction reaction force calculating unit 32 transmits a command signal to the rotation direction reaction force motor 16 so as to generate the reaction force.

The pushing direction reaction force calculating unit 34 calculates a reaction force value in the direction parallel to the rotating shaft of the steering wheel 12 which corresponds to the detection value of each of the pushing amount sensor 18, the vehicle speed sensor 22, the rotation G sensor 24, the driver weight detecting sensor 26, and the one hand detecting sensor 28. The pushing direction reaction force calculating unit 34 includes a spring reaction force calculating unit 36 that calculates a spring reaction force which is proportional to the amount of pushing and the amount of pulling of the steering wheel 12. In addition, the pushing direction reaction force calculating unit 34 includes a viscosity reaction force calculating unit 38 that calculates a viscosity reaction force which is proportional to a variation in the amount of pushing and the amount of pulling of the steering wheel 12 per unit time. The pushing direction reaction force calculating unit 34 transmits a command signal to the pushing direction reaction force motor 20 so as to generate the reaction force.

The tire angle control unit 40 calculates a tire angle corresponding to the detection values of the steering wheel angle sensor 14 and the pushing amount sensor 18. The tire angle control unit 40 includes a gear ratio calculating unit 42 that calculates a gear ratio, which is the ratio of a variation in the angle of the front tire 50 to the rotation angle of the steering wheel 12 about the rotating shaft. The tire angle control unit 40 includes a tire angle calculating unit 44 that calculates the angle of the front tire 50 from the detection value of the steering wheel angle sensor 14 and the gear ratio calculated by the gear ratio calculating unit 42. The tire angle control unit 40 transmits a command signal to a tire angle change motor 46 for driving the front tire 50 such that the front tire 50 is aligned at the tire angle calculated by the tire angle calculating unit 44. The tire angle control unit 40 receives the tire angle detection value of the front tire 50 from the tire angle sensor 48 attached to the front tire 50.

Next, the operation of the steering control system 10 according to this embodiment will be described. The steering control system 10 according to this embodiment performs steering control immediately after the vehicle is suddenly decelerated, steering control when the vehicle turns suddenly, and steering control when the driver performs a driving operation with one hand, in addition to steering control corresponding to a normal vehicle speed. Next, the steering control processes in each case will be sequentially described.

(Steering Control Corresponding to Vehicle Speed)

Figure 2:
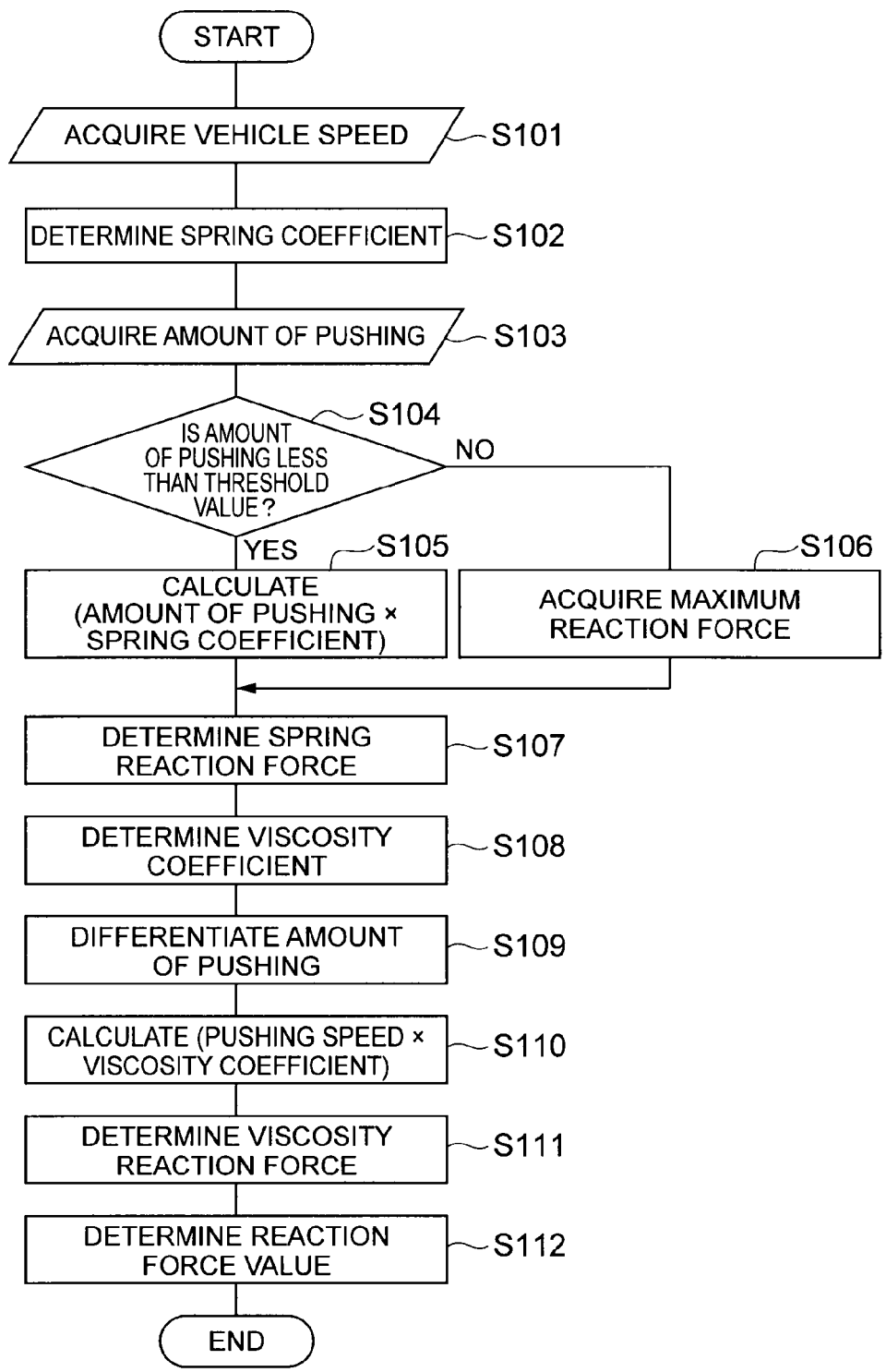
FIG. 2 is a flowchart illustrating an operation of determining a reaction force value in a direction in which a steering wheel is pushed.
Figure 4:
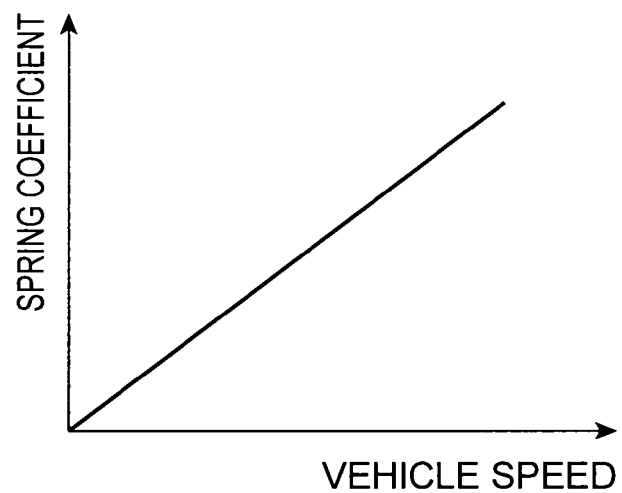
FIG. 4 is a graph illustrating the relation between a vehicle speed and a spring coefficient of a spring reaction force in the pushing direction of the steering wheel.

As shown in FIG. 2, the pushing direction reaction force calculating unit 34 of the ECU 30 acquires the speed of the host vehicle using the vehicle speed sensor 22 (S101). The spring reaction force calculating unit 36 of the pushing direction reaction force calculating unit 34 determines a spring coefficient on the basis of the relation between the vehicle speed and the spring coefficient which are set as shown in FIG. 4 (S102). The pushing direction reaction force calculating unit 34 acquires the amount of pushing of the steering wheel 12 in the direction parallel to the rotating shaft using the pushing amount sensor 18 (S103).

When the amount of pushing is less than a predetermined threshold value (S104), the spring reaction force calculating unit 36 calculates (the amount of pushing x the spring coefficient) (S105). The spring reaction force calculating unit 36 determines the calculated value to be the spring reaction force (S107). When the amount of pushing is equal to or more than the predetermined threshold value (S104), the spring reaction force calculating unit 36 acquires the maximum reaction force that can be generated by the pushing direction reaction force motor 20 from the pushing direction reaction force motor 20 (S106). The spring reaction force calculating unit 36 determines the maximum reaction force to be the spring reaction force (S107).

Figure 3:
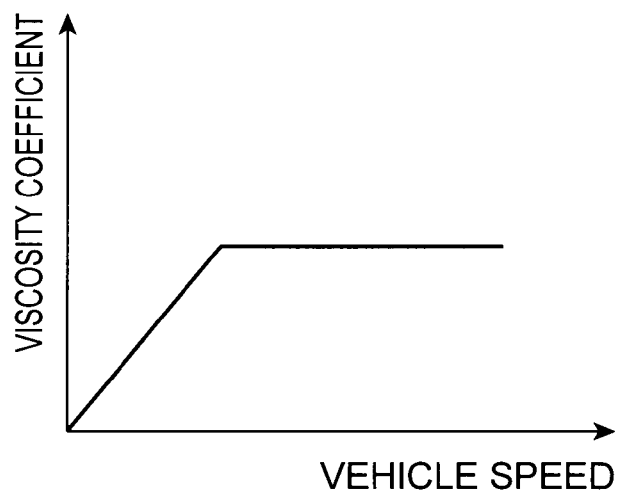
FIG. 3 is a graph illustrating the relation between a vehicle speed and a viscosity coefficient of a viscosity reaction force in the pushing direction of the steering wheel.

The viscosity reaction force calculating unit 38 of the pushing direction reaction force calculating unit 34 determines a viscosity coefficient on the basis of the relation between the vehicle speed and the viscosity coefficient which are set as shown in FIG. 3 (S108). The viscosity reaction force calculating unit 38 differentiates a pushing speed, which is a variation in the amount of pushing per unit time acquired in Step S103 (S109). The viscosity reaction force calculating unit 38 calculates (the pushing speed x the viscosity coefficient) (S110). The viscosity reaction force calculating unit 38 determines the calculated value to be the viscosity reaction force (S111). In this way, the spring reaction force calculating unit 36 determines a reaction force value against the operation of pushing the steering wheel 12 in the direction parallel to the rotating shaft (S112).

Figure 5:
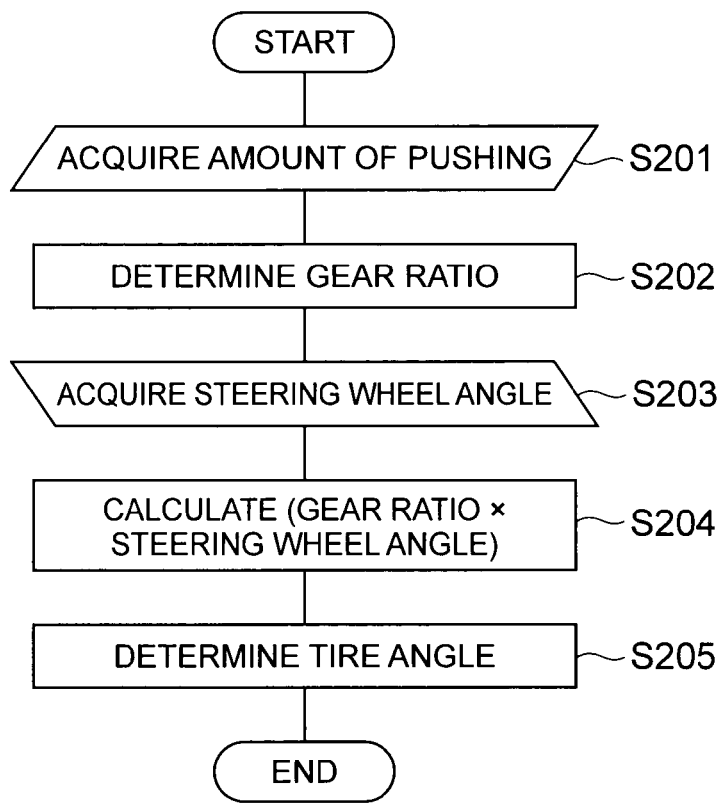
FIG. 5 is a flowchart illustrating an operation of determining a tire angle.
Figure 6:
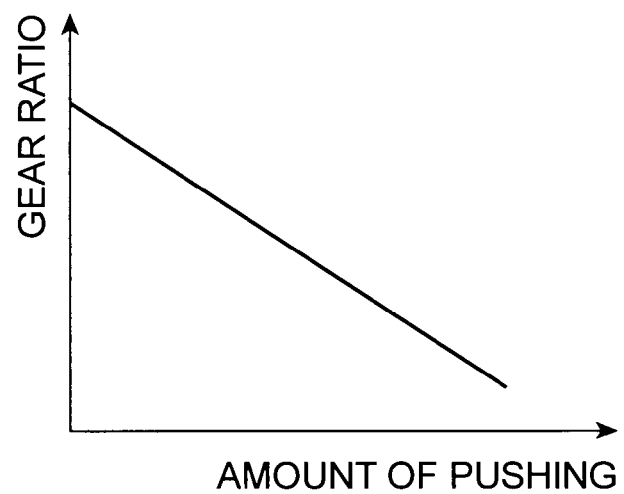
FIG. 6 is a graph illustrating the relation between the amount of pushing of the steering wheel and the gear ratio of the tire angle to the rotation angle of the steering wheel.

As shown in FIG. 5, the tire angle control unit 40 acquires the amount of pushing of the steering wheel 12 in the direction parallel to the rotating shaft using the pushing amount sensor 18 (S201). The gear ratio calculating unit 42 of the tire angle control unit 40 determines the gear ratio on the basis of the relation between the amount of pushing and the gear ratio which are set as shown in FIG. 6 (S202). The tire angle control unit 40 acquires a steering wheel angle, which is the rotation angle of the steering wheel 12 about the rotating shaft, using the steering wheel angle sensor 14 (S203). The tire angle calculating unit 44 of the tire angle control unit 40 calculates (the gear ratio×the steering wheel angle) (S204). The tire angle calculating unit 44 determines the calculated value to be the tire angle (S205). The tire angle change motor 46 drives the front tire 50 such that the front tire 50 is aligned at the tire angle calculated by the tire angle calculating unit 44.

In the steering control corresponding to the vehicle speed, the steering wheel angle sensor 14 detects the rotation angle of the steering wheel 12 by the driver about the rotating shaft and the tire angle change motor 46 steers the host vehicle according to the tire angle corresponding to the rotation angle of the steering wheel 12 detected by the steering wheel angle sensor 14. In addition, the pushing amount sensor 18 detects the amount of pushing of the steering wheel 12 by the driver in the direction parallel to the rotating shaft and the gear ratio calculating unit 42 of the tire angle control unit 40 changes the amount of steering corresponding to the rotation angle of the steering wheel 12 required for the tire angle change motor 46 to steer the host vehicle, depending on the amount of pushing of the steering wheel 12 detected by the pushing amount sensor 18. Therefore, the amount of steering corresponding to the rotation angle of the steering wheel 12 by the driver is changed depending on the amount of pushing of the steering wheel 12 by the driver. In this way, it is possible to improve the convenience of a driving operation for steering. In addition, the pushing direction reaction force motor 20 changes the reaction force generated against the amount of pushing of the steering wheel 12 by the driver, depending on the speed of the host vehicle detected by the vehicle speed sensor 22. Therefore, it is possible to prevent the vehicle from being steered by an unintended operation of the driver using the reaction force in various traveling states of the vehicle.

The pushing amount sensor 18 detects the amount of pushing of the steering wheel 12 including a component in the front-rear direction of the host vehicle which is likely to be affected by the acceleration of the host vehicle in the front-rear direction. The pushing direction reaction force motor 20 changes the reaction force generated against the amount of pushing of the steering wheel by the driver, depending on the speed of the host vehicle detected by the vehicle speed sensor 22. Therefore, for the operation including the component in the front-rear direction of the host vehicle which is likely to be affected by the acceleration of the host vehicle in the traveling direction, it is possible to prevent the host vehicle from being steered by an unintended operation of the driver using the reaction force. In addition, since the direction of the operation of the driver rotating the steering wheel 12 is perpendicular to the direction of the operation of the driver pushing the steering wheel 12, it is easy for the driver to give different operations to the system.

In particular, the gear ratio calculating unit 42 can change the amount of steering corresponding to the rotation angle of the steering wheel 12, according to the general operation of the driver pushing or pulling the steering wheel 12 in the direction parallel to the rotating shaft. Therefore, it is possible to further improve the convenience of a driving operation for steering. The pushing direction reaction force motor 20 changes the reaction force generated against the operation of the driver pushing the steering wheel 12 in the direction parallel to the rotating shaft, depending on the vehicle speed of the host vehicle detected by the vehicle speed sensor 22. Therefore, for the operation of the steering wheel 12 in the direction parallel to the rotating shaft which is likely to be affected by the acceleration of the host vehicle in the traveling direction, it is possible to prevent the host vehicle from being steered by an unintended operation of the driver using the reaction force.

In addition, the pushing direction reaction force motor 20 changes the reaction force generated against the amount of pushing of the steering wheel by the driver, depending on the speed of the host vehicle detected by the vehicle speed sensor 22. Stability and responsiveness required for the steering operation of the driver vary depending on the speed of the host vehicle. However, in this embodiment, it is possible to adjust the stability and responsiveness of the steering operation of the driver using the reaction force, according to the speed of the host vehicle.

In particular, the pushing direction reaction force motor 20 increases the generated reaction force as the speed of the host vehicle detected by the vehicle speed sensor 22 increases. As the speed of the host vehicle increases, higher stability is needed in the steering operation of the driver. However, in this structure, as the speed of the host vehicle increases, the reaction force increases, which makes it possible to improve the stability of the steering operation of the driver.

The pushing direction reaction force motor 20 generates, as the reaction force, the spring reaction force which is proportional to the amount of pushing of the steering wheel 12. Therefore, it is possible to improve the stability of the steering operation of the driver. The spring reaction force is determined by a spring coefficient corresponding to the speed of the host vehicle. Therefore, the pushing direction reaction force motor 20 can generate a reaction force suitable for the traveling state of the host vehicle.

The pushing direction reaction force motor 20 generates, as the reaction force, the viscosity reaction force which is proportional to a variation in the amount of pushing of the steering wheel 12 per unit time. Therefore, it is possible to improve the stability of the steering operation of the driver. The viscosity reaction force is determined by a viscosity coefficient corresponding to the speed of the host vehicle. Therefore, the reaction force generating unit can generate a reaction force suitable for the traveling state of the host vehicle.

The steer-by-wire type steering control system 10 according to this embodiment reduces the gear ratio at a low speed and reduces the amount of operation rotating the steering wheel 12, thereby improving the responsiveness of steering, when the driver pushes the steering wheel 12. In addition, the steering control system 10 increases the gear ratio at a high speed to improve the stability of steering when the driver pulls the steering wheel 12. In this embodiment, the gear ratio is changed by the operation of the steering wheel 12 in the pushing direction other than the rotation direction. Therefore, specifically, the steering control system 10 can change the gear ratio on the basis of the intention of the driver.

However, when the vehicle travels at a high speed, it is considered that the driver pushes the steering wheel 12 in order to support the body. In addition, when the vehicle travels at a high speed, it is considered that the driver applies force in the direction in which the steering wheel 12 is pushed in order to correct steering. In this case, it is not preferable that the gear ratio be changed. Therefore, in this embodiment, when the vehicle travels at a high speed, the steering control system 10 increases the reaction force in the pushing direction of the steering wheel 12 to prevent an unintended change of the gear ratio. In particular, when the amount of pushing is equal to or more than a threshold value, the steering control system 10 maximizes the spring reaction force such that the amount of pushing of the steering wheel 12 is less than a predetermined value, in order to change the gear ratio allowed by the speed of the vehicle.

(Steering Control When Vehicle is Decelerated Suddenly)

Figure 7:
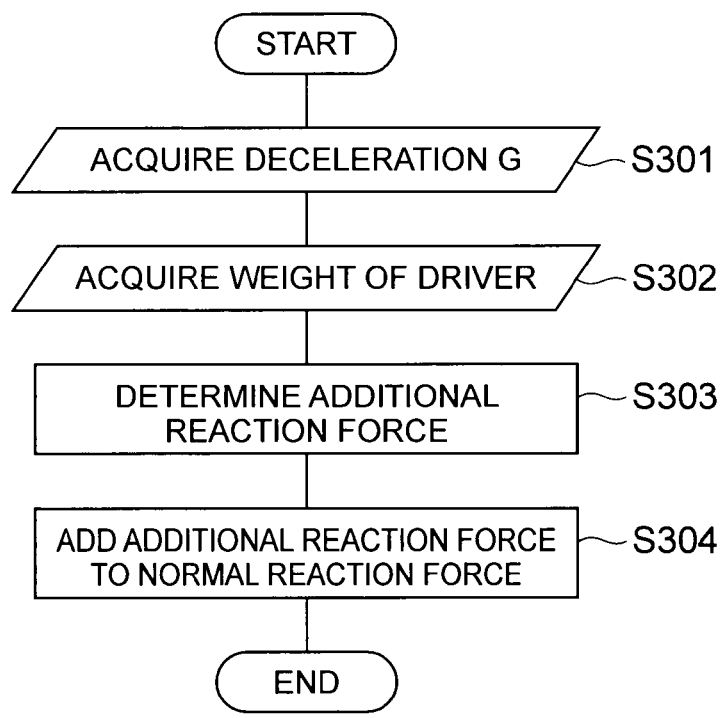
FIG. 7 is a flowchart illustrating an operation of adding an additional reaction force to a normal reaction force in the pushing direction of the steering wheel according to a deceleration G and the weight of the driver.
Figure 8:
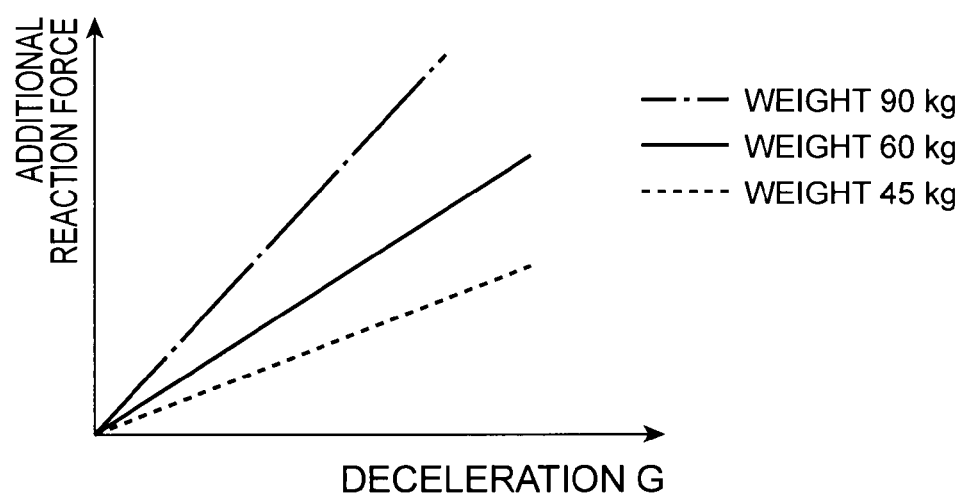
FIG. 8 is a graph illustrating the relation among the deceleration G, the weight of the driver, and the additional reaction force.

As shown in FIG. 7, the pushing direction reaction force calculating unit 34 of the ECU 30 acquires, for example, a deceleration G of 0.2 G or more using the vehicle speed sensor 22 (S301). The pushing direction reaction force calculating unit 34 acquires the weight of the driver using the driver weight detecting sensor 26 (S302). The pushing direction reaction force calculating unit 34 determines an additional reaction force on the basis of the relation among the deceleration G, the weight of the driver, and the additional reaction force which are set as shown in FIG. 8 (S303). The pushing direction reaction force calculating unit 34 adds the additional reaction force to a normal reaction force which is calculated on the basis of the speed of the vehicle (S304).

In the above-mentioned control, the vehicle speed sensor 22 detects the deceleration of the host vehicle. Therefore, the pushing direction reaction force motor 20 changes the reaction force generated against the amount of pushing of the steering wheel 12 by the driver, depending on the deceleration of the host vehicle detected by the vehicle speed sensor 22. As a result, for the operation of the driver which is likely to be affected by the deceleration of the host vehicle, it is possible to prevent the vehicle from being steered by an unintended operation of the driver using the reaction force.

In particular, when the vehicle is suddenly decelerated, in some cases, the driver pushes the steering wheel 12 to support the body. In this embodiment, the pushing direction reaction force motor 20 increases the generated reaction force as the deceleration of the host vehicle detected by the vehicle speed sensor 22 increases. As the deceleration of the host vehicle increases, the operation of the driver is more likely to be affected. However, in this structure, as the deceleration of the host vehicle increases, a stronger reaction force is generated by the additional reaction force. Therefore, it is possible to prevent the vehicle from being steered by the unintended operation of the driver pushing the steering wheel 12.

In this embodiment, the pushing direction reaction force motor 20 increases the generated reaction force as the weight of the driver of the host vehicle detected by the driver weight detecting sensor 26 increases. As the weight of the driver increases, the operation of the driver is more likely to be affected at the same deceleration. However, in this embodiment, as the weight of the driver increases, a stronger reaction force is generated, which makes it possible to prevent the vehicle from being steered by an unintended operation of the driver.

(Steering Control When Vehicle Turns Suddenly)

Figure 9:
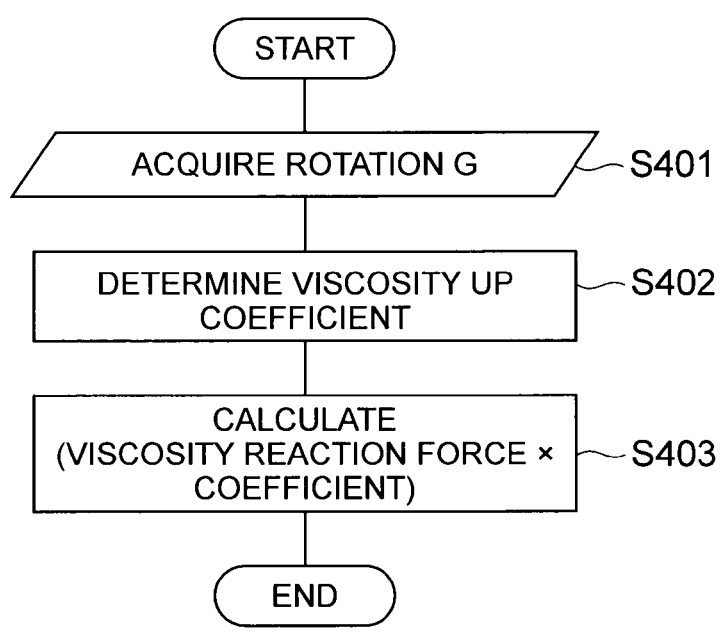
FIG. 9 is a flowchart illustrating an operation of increasing the viscosity reaction force in the pushing direction of the steering wheel according to a rotation G.
Figure 10:
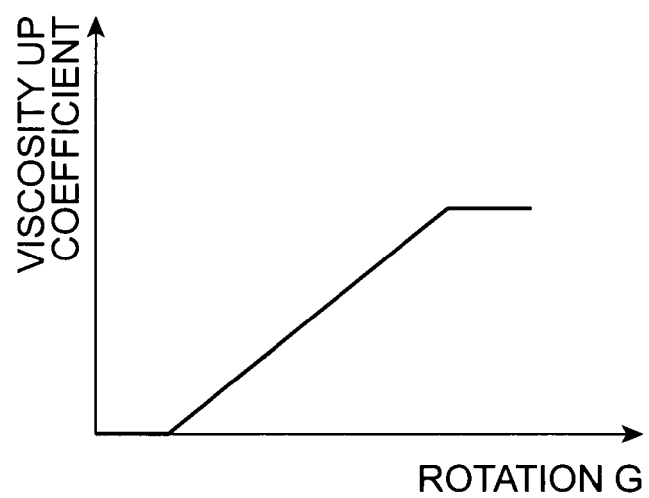
FIG. 10 is a graph illustrating the relation between the rotation G and a viscosity UP coefficient.

As shown in FIG. 9, the pushing direction reaction force calculating unit 34 of the ECU 30 acquires, for example, a rotation G of 0.2 G or more using the rotation G sensor 24 (S401). The viscosity reaction force calculating unit 38 of the pushing direction reaction force calculating unit 34 determines a viscosity UP coefficient on the basis of the relation between the rotation G and the viscosity UP coefficient which are set as shown in FIG. 10 (S402). The viscosity reaction force calculating unit 38 calculates (the viscosity reaction force x the viscosity UP coefficient) (S403).

In the above-mentioned control, the rotation G sensor 24 detects the acceleration of the host vehicle in the horizontal direction as the traveling state of the host vehicle. Therefore, the pushing direction reaction force motor 20 changes the reaction force generated against the amount of pushing of the steering wheel 12 by the driver, depending on the acceleration of the host vehicle in the horizontal direction which is detected by the rotation G sensor 24. Therefore, for the operation of the driver which is likely to be affected by the acceleration of the host vehicle in the horizontal direction, it is possible to prevent the vehicle from being steered by an unintended operation of the driver using the reaction force.

That is, when the vehicle turns, it is considered that the driver applies power to the steering wheel 12 in the direction parallel to the rotating shaft in order to support the body with the steering wheel 12. The pushing direction reaction force motor 20 generates, as the reaction force, a viscosity reaction force, which is the product of the viscosity coefficient corresponding to the acceleration of the host vehicle in the horizontal direction which is detected by the rotation G sensor 24 and a variation in the amount of pushing per unit time. The pushing direction reaction force motor 20 increases the generated viscosity reaction force as the acceleration of the host vehicle in the horizontal direction which is detected by the rotation G sensor 24 increases. As the acceleration of the host vehicle in the horizontal direction increases, the driver is more likely to perform an unintended operation in order to support the body with the steering wheel 12. However, in this embodiment, as the acceleration of the host vehicle in the horizontal direction increases, the viscosity reaction force increases. Therefore, it is possible to prevent the vehicle from being steered by the unintended operation of the driver using the viscosity reaction force.

(Steering Control When Driver Performs Driving Operation With One Hand)

Figure 11:
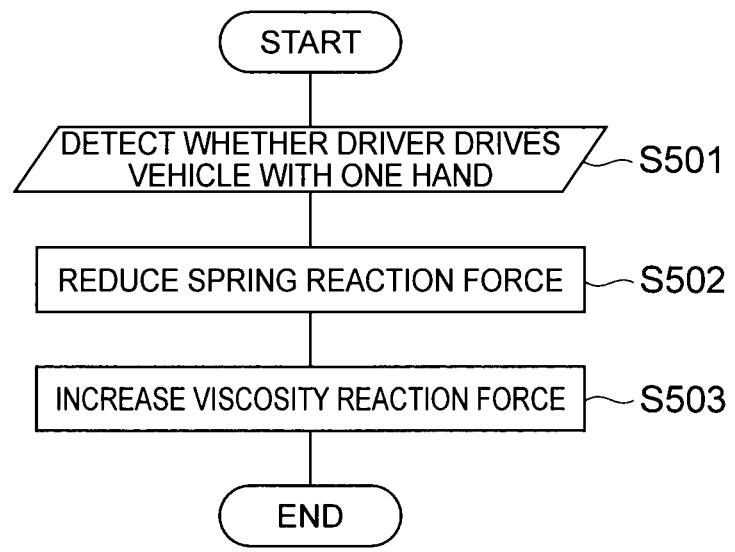
FIG. 11 is a flowchart illustrating an operation of increasing the viscosity reaction force in the pushing direction of the steering wheel when the driver performs a driving operation with one hand.

As shown in Fig. 11, the pushing direction reaction force calculating unit 34 of the ECU 30 detects that the driver drives the vehicle while holding the steering wheel 12 with one hand, using the one hand driving detecting sensor 28 (S501). The spring reaction force calculating unit 36 of the pushing direction reaction force calculating unit 34 reduces the spring reaction force to be weaker than that when the driver holds the steering wheel 12 with both hands (S502). The viscosity reaction force calculating unit 38 of the pushing direction reaction force calculating unit 34 increases the viscosity reaction force to be stronger than that when the driver holds the steering wheel 12 with both hands (S503).

In the above-mentioned control, the pushing direction reaction force motor 20 changes the generated reaction force depending on the holding state of the steering wheel 12 detected by the one hand driving detecting sensor 28. The possibility of the driver performing an unintended operation varies depending on the holding state of the steering wheel 12 by the driver. However, in this structure, the reaction force corresponding to the holding state makes it possible to prevent the vehicle from being steered by an unintended operation of the driver.

In particular, in this embodiment, the one hand driving detecting sensor 28 detects whether the driver holds the steering wheel 12 with one hand or both hands. When the one hand driving detecting sensor 28 detects that the driver holds the steering wheel 12 with one hand, the pushing direction reaction force motor 20 reduces the spring reaction force and increases the viscosity reaction force, as compared to when the one hand driving detecting sensor 28 detects that the driver holds the steering wheel 12 with both hands. When the driver holds the steering wheel 12 with one hand, the possibility of the driver performing an unintended operation due to the spring reaction force is more than that when the driver holds the steering wheel 12 with the both hands. That is, when the spring reaction force is strong and the driver changes the holding method from a method of holding the steering wheel 12 with both hands to a method of holding the steering wheel 12 with one hand, the holding force of the steering wheel 12 is changed and the steering wheel 12 is pushed by the spring reaction force. However, in this embodiment, when the driver holds the steering wheel 12 with one hand, the spring reaction force is reduced and the viscosity reaction force increases, as compared to when the driver holds the steering wheel 12 with both hands. In this way, it is possible to prevent the movement of the steering wheel 12 and thus prevent the vehicle from being steered by an unintended operation of the driver.

The embodiment of the invention has been described above, but the invention is not limited to the above-described embodiment. Various modifications of the invention can be made. For example, in the above-described embodiment, the driver performs an operation of rotating the steering wheel 12 and an operation of pushing the steering wheel 12 in the direction parallel to the rotating shaft to give the amount of operation to the system.

However, in the invention, for example, the angle of the front tire 50 with respect to the amount of operation that rotates the steering wheel 12 about the rotating shaft may be changed by the amount of operation that tilts the steering wheel 12 on the rotating shaft in the front-rear direction or the left-right direction of the host vehicle. Alternatively, in the invention, the angle of the front tire 50 with respect to the amount of operation that tilts the steering wheel 12 on the rotating shaft in the left-right direction of the host vehicle may be changed by the amount of operation that rotates the steering wheel 12 about the rotating shaft.

Industrial Applicability

The steering control system according to the invention can improve the convenience of a driving operation for steering, without preventing the vehicle from being steered by an unintended operation of the driver, in various traveling states of the vehicle.

REFERENCE SIGNS LIST

10: STEERING CONTROL SYSTEM
12: STEERING WHEEL
14: STEERING WHEEL ANGLE SENSOR
16: ROTATION DIRECTION REACTION FORCE MOTOR
18: PUSHING AMOUNT SENSOR
20: PUSHING DIRECTION REACTION FORCE MOTOR
22: VEHICLE SPEED SENSOR
24: ROTATION G SENSOR
26: DRIVER WEIGHT DETECTING SENSOR
28: ONE HAND DRIVING DETECTING SENSOR
30: ECU
32: ROTATION DIRECTION REACTION FORCE CALCULATING UNIT
34: PUSHING DIRECTION REACTION FORCE CALCULATING UNIT
36: SPRING REACTION FORCE CALCULATING UNIT
38: VISCOSITY REACTION FORCE CALCULATING UNIT
40: TIRE ANGLE CONTROL UNIT
42: GEAR RATIO CALCULATING UNIT
44: TIRE ANGLE CALCULATING UNIT
46: TIRE ANGLE CHANGE MOTOR
48: TIRE ANGLE SENSOR
50: FRONT TIRE

The invention claimed is:

1. A steering control system comprising:
a steering unit that steers a host vehicle according to an amount of steering corresponding to a first operation amount of the host vehicle by a driver in a rotation direction;
a steering amount change unit that changes the amount of steering corresponding to the first operation amount required for the steering unit to steer the host vehicle, depending on a second operation amount of the host vehicle by the driver in a second direction;
a reaction force generating unit that generates a reaction force against the second operation amount in a direction opposite to the second direction; and
a traveling state detecting unit that detects a traveling state of the host vehicle,
wherein the reaction force generating unit changes the generated reaction force, depending on the traveling state of the host vehicle detected by the traveling state detecting unit, and
the second direction is perpendicular to a plane of the rotation direction.

2. A steering control system comprising:
a steering unit that steers a host vehicle according to an amount of steering corresponding to a first operation amount of the host vehicle by a driver in a first direction;
a steering amount change unit that changes the amount of steering corresponding to the first operation amount required for the steering unit to steer the host vehicle, depending on a second operation amount of the host vehicle by the driver in a second direction;
a reaction force generating unit that generates a reaction force against the second operation amount in a direction opposite to the second direction; and a traveling state detecting unit that detects a traveling state of the host vehicle, wherein the reaction force generating unit changes the generated reaction force, depending on the traveling state of the host vehicle detected by the traveling state detecting unit, one of the first operation amount in the first direction and the second operation amount in the second direction is a rotation angle in a rotation direction about a predetermined rotating shaft, and the other one of the first operation amount in the first direction and the second operation amount in the second direction is a tilt angle of the rotating shaft on a predetermined fulcrum.

3. A steering control system comprising:

a steering unit that steers a host vehicle according to an amount of steering corresponding to a first operation amount of the host vehicle by a driver in a first direction;

a steering amount change unit that changes the amount of steering corresponding to the first operation amount required for the steering unit to steer the host vehicle, depending on a second operation amount of the host vehicle by the driver in a second direction;

a reaction force generating unit that generates a reaction force against the second operation amount in a direction opposite to the second direction; and a traveling state detecting unit that detects a traveling state of the host vehicle, wherein the reaction force generating unit changes the generated reaction force, depending on the traveling state of the host vehicle detected by the traveling state detecting unit, the first operation amount in the first direction is a rotation angle of a steering wheel of the host vehicle in the rotation direction, and the second operation amount in the second direction is the distance of the steering wheel pushed or pulled in a direction parallel to the rotating shaft.

4. A steering control system comprising:

a steering unit that steers a host vehicle according to an amount of steering corresponding to a first operation amount of the host vehicle by a driver in a first direction;

a steering amount change unit that changes the amount of steering corresponding to the first operation amount required for the steering unit to steer the host vehicle, depending on a second operation amount of the host vehicle by the driver in a second direction;

a reaction force generating unit that generates a reaction force against the second operation amount in a direction opposite to the second direction; and a traveling state detecting unit that detects a traveling state of the host vehicle, wherein the reaction force generating unit changes the generated reaction force, depending on the traveling state of the host vehicle detected by the traveling state detecting unit, the traveling state detecting unit detects the speed of the host vehicle as the traveling state of the host vehicle, and the reaction force generating unit increases the generated reaction force as the speed of the host vehicle detected by the traveling state detecting unit increases.

5. A steering control system comprising:

a steering unit that steers a host vehicle according to an amount of steering corresponding to a first operation amount of the host vehicle by a driver in a first direction;

a steering amount change unit that changes the amount of steering corresponding to the first operation amount required for the steering unit to steer the host vehicle, depending on a second operation amount of the host vehicle by the driver in a second direction;

a reaction force generating unit that generates a reaction force against the second operation amount in a direction opposite to the second direction; and a traveling state detecting unit that detects a traveling state of the host vehicle, wherein the reaction force generating unit changes the generated reaction force, depending on the traveling state of the host vehicle detected by the traveling state detecting unit, the traveling state detecting unit detects the deceleration of the host vehicle as the traveling state of the host vehicle, and the reaction force generating unit increases the generated reaction force as the deceleration of the host vehicle detected by the traveling state detecting unit increases.

6. The steering control system according to claim 5, further comprising:

a driver weight detecting unit that measures the weight of the driver of the host vehicle, wherein the reaction force generating unit increases the generated reaction force as the weight of the driver of the host vehicle detected by the driver weight detecting unit increases.

7. A steering control system comprising:

a steering unit that steers a host vehicle according to an amount of steering corresponding to a first operation amount of the host vehicle by a driver in a first direction;

a steering amount change unit that changes the amount of steering corresponding to the first operation amount required for the steering unit to steer the host vehicle, depending on a second operation amount of the host vehicle by the driver in a second direction;

a reaction force generating unit that generates a reaction force against the second operation amount in a direction opposite to the second direction; and a traveling state detecting unit that detects a traveling state of the host vehicle, wherein the reaction force generating unit changes the generated reaction force, depending on the traveling state of the host vehicle detected by the traveling state detecting unit;

the traveling state detecting unit detects the acceleration of the host vehicle in a horizontal direction as the traveling state of the host vehicle, the reaction force generating unit generates a viscosity reaction force, which is the product of a viscosity coefficient corresponding to the acceleration of the host vehicle in the horizontal direction which is detected by the traveling state detecting unit and a variation in the second operation amount per unit time, as the reaction force, and the reaction force generating unit increases the generated viscosity reaction force as the acceleration of the host vehicle in the horizontal direction which is detected by the traveling state detecting unit increases.

8. A steering control system comprising:

a steering unit that steers a host vehicle according to an amount of steering corresponding to a first operation amount of the host vehicle by a driver in a first direction;

a steering amount change unit that changes the amount of steering corresponding to the first operation amount required for the steering unit to steer the host vehicle, depending on a second operation amount of the host vehicle by the driver in a second direction;

a reaction force generating unit that generates a reaction force against the second operation amount in a direction opposite to the second direction;
a traveling state detecting unit that detects a traveling state of the host vehicle,
an operation member that is used by the driver of the host vehicle to give the second operation amount in the second direction; and
a holding state detecting unit that detects a holding state of the operation member by the driver of the host vehicle,
wherein the reaction force generating unit changes the generated reaction force, depending on the traveling state of the host vehicle detected by the traveling state detecting unit, and
the reaction force generating unit changes the generated reaction force, depending on the holding state detected by the holding state detecting unit.

9. A steering control system comprising:
a steering unit that steers a host vehicle according to an amount of steering corresponding to a first operation amount of the host vehicle by a driver in a first direction;
a steering amount change unit that changes the amount of steering corresponding to the first operation amount required for the steering unit to steer the host vehicle, depending on a second operation amount of the host vehicle by the driver in a second direction;
a reaction force generating unit that generates a reaction force against the second operation amount in a direction opposite to the second direction;
a traveling state detecting unit that detects a traveling state of the host vehicle;
an operation member that is used by the driver of the host vehicle to give the second operation amount in the second direction; and
a holding state detecting unit that detects a holding state of the operation member by the driver of the host vehicle,
wherein the reaction force generating unit changes the generated reaction force, depending on the holding state detected by the holding state detecting unit and on the traveling state of the host vehicle detected by the traveling state detecting unit;
the holding state detecting unit detects, as the holding state, whether the driver of the host vehicle holds the operation member with one hand or both hands,
the reaction force generating unit generates the spring reaction force, which is the product of the spring coefficient corresponding to the traveling state of the host vehicle detected by the traveling state detecting unit and the second operation amount, and the viscosity reaction force, which is the product of the viscosity coefficient corresponding to the traveling state of the host vehicle detected by the traveling state detecting unit and the variation in the second operation amount per unit time, and
when the holding state detecting unit detects that the driver of the host vehicle holds the operation member with one hand, the reaction force generating unit reduces the spring reaction force and increases the viscosity reaction force, as compared to when the holding state detecting unit detects that the driver of the host vehicle holds the operation member with both hands.

* * * * *